(12) United States Patent
Serafini et al.

(10) Patent No.: US 9,903,417 B2
(45) Date of Patent: Feb. 27, 2018

(54) ASSEMBLY PROCEDURE OF A BEARING UNIT—HUB FLANGE

(71) Applicants: Andrea Serafini, Pinerolo (IT); Flavio Franza, San Secondo di Pinerolo (IT); Laura Sguotti, Pinerolo (IT)

(72) Inventors: Andrea Serafini, Pinerolo (IT); Flavio Franza, San Secondo di Pinerolo (IT); Laura Sguotti, Pinerolo (IT)

(73) Assignee: AKTIEBOLAGET SKF (SE)

( * ) Notice: Subject to any disclaimer, the term of this patent is extended or adjusted under 35 U.S.C. 154(b) by 17 days.

(21) Appl. No.: 15/139,669

(22) Filed: Apr. 27, 2016

(65) Prior Publication Data
US 2016/0319876 A1    Nov. 3, 2016

(30) Foreign Application Priority Data
Apr. 29, 2015   (IT) .................. 102015000013551

(51) Int. Cl.
*F16C 43/00* (2006.01)
*F16C 43/06* (2006.01)
(Continued)

(52) U.S. Cl.
CPC ............ *F16C 43/065* (2013.01); *F16C 19/18* (2013.01); *F16C 19/185* (2013.01); *F16C 33/76* (2013.01);
(Continued)

(58) Field of Classification Search
CPC .... F16C 43/065; F16C 19/185; F16C 19/187; F16C 2326/02
See application file for complete search history.

(56) References Cited

U.S. PATENT DOCUMENTS

| 1,146,271 A | * | 7/1915 | Mossig et al. .......... | F16C 33/40 384/511 |
| 3,340,590 A | * | 9/1967 | Reynolds ................ | F16C 43/06 29/714 |

(Continued)

FOREIGN PATENT DOCUMENTS

| EP | 2602123 A1 | 6/2013 |
| FR | 2888625 A1 | 1/2007 |

(Continued)

OTHER PUBLICATIONS

Machine Translation of FR 2,888,625, Jun. 7, 2017.*

*Primary Examiner* — Thomas R Hannon
(74) *Attorney, Agent, or Firm* — Bryan Peckjian; SKF USA Inc. Patent Dept.

(57) ABSTRACT

A procedure for mounting of a hub bearing assembly having a rotatable hub, and a bearing unit having a stationary radially outer ring, and two bodies rolling crowns disposed between the radially outer ring and the hub. The assembly process involves the following steps: a) pressing-fit a first seal on the hub, b) mounting an axially external cage and the axially outside rolling bodies, in correspondence with a track of the axially outer hub, c) the radially outer ring assembly and inclination of the same outer ring of a predetermined angle with respect to the hub, d) mounting of the axially interior rolling bodies in correspondence with a track of the axially inner hub, and the radially outer ring alignment to the hub, f) snap insertion of the axially internal cage on rolling bodies and g) the pressing-fit a second seal on its seat.

8 Claims, 8 Drawing Sheets

(51) Int. Cl.
  *F16C 19/18* (2006.01)
  *F16C 33/76* (2006.01)
  *F16C 43/04* (2006.01)
  *F16C 33/41* (2006.01)

(52) U.S. Cl.
  CPC ............ *F16C 43/06* (2013.01); *F16C 33/416* (2013.01); *F16C 43/045* (2013.01); *F16C 2226/12* (2013.01); *F16C 2226/74* (2013.01); *F16C 2326/02* (2013.01)

(56) References Cited

U.S. PATENT DOCUMENTS

| | | | |
|---|---|---|---|
| 3,532,401 A | | 10/1970 | McKee |
| 4,106,827 A | * | 8/1978 | Ducret ................. F16C 19/187 384/482 |
| 4,411,479 A | | 10/1983 | Hirata et al. |
| 4,621,700 A | * | 11/1986 | Merkelbach ........ B60B 27/0005 180/254 |
| 5,421,088 A | * | 6/1995 | Kawamura ............. F16C 19/18 29/447 |
| 5,491,893 A | * | 2/1996 | Hurrell, II .......... B60B 27/0005 29/898.061 |
| 5,678,310 A | * | 10/1997 | Chiba .................... F16C 43/06 29/464 |
| 7,614,796 B2 | * | 11/2009 | Hattori ................ B60B 27/0005 384/544 |
| 2002/0176640 A1 | | 9/2002 | Yano |

FOREIGN PATENT DOCUMENTS

| | | |
|---|---|---|
| JP | 2007224941 A | 9/2007 |
| WO | 2010085971 A1 | 5/2010 |

* cited by examiner

ASSEMBLY PROCEDURE OF A BEARING UNIT—HUB FLANGE

CROSS-REFERENCE TO RELATED APPLICATIONS

This application claims priority to Italian patent application no. 102015000013551 filed on Apr. 29, 2015, the contents of which are fully incorporated herein by reference.

TECHNICAL FIELD OF THE INVENTION

The present invention relates to a procedure for mounting a bearing group including a flanged hub, i.e. the so-called third generation of rolling bearing. The group in question is suitable for applications where the outer ring of the bearing is stationary, or for use with the wheels of motor vehicles.

TECHNICAL BACKGROUND

Certain bearing assemblies are known for use with the wheels of motor vehicles. Spanish Patent EP 2602123 A1, for example, describes a hub bearing unit, in this case an asymmetrical one, for the wheel of a motor vehicle, which includes a flanged hub rotatable around a rotation axis, a flange integral with the flanged hub and transverse to the axis of rotation, a stationary ring disposed radially outside of the flanged hub and provided with rolling tracks axially spaced from one another, and two rolling bodies crowns (for example, balls) arranged between the stationary ring and the flanged hub. The flanged hub integrally forms a radially inner raceway for the ball bearing axially outer, while the radially inner raceway for the balls axially inner crown is formed on an inner ring of the bearing, radially outer planted on flanged hub.

Such a bearing assembly may place considerable local loads between the bearing rings and rolling bodies, especially in the case of heavy duty applications in terms of load transmitted. Additionally, such a bearing assembly do not allow the bearing to obtain large values of resistance of the bearing and its greater duration in time. Finally, such a bearing assembly presents important axial dimensions, due to the presence of a flange integral to the flange portion and the hub transverse to the axis of rotation.

To increase the performance and especially the stiffness of the bearing, it may be preferable to increase the distance of the pressure centers. This can be achieved by increasing the diameter of the circumference of the centers of the rolling bodies (the so-called "pitch diameter" or more simply "pitch") of the bearing. Such solutions are already known and are developed in order to significantly improve the performance. The disadvantage connected to the increase of the "pitch" is that consequently it also increases the volume, and therefore weight, dramatically with the "pitch-squared value". This increase in weight can usually not be accepted by car manufacturers.

A further improvement is to provide an even greater increase to the diameter of the circumference of the centers of the rolling bodies, so as to be able to enter inside the bearing constant velocity joint and integrate in a single piece the so-called bell of the joint with the hub, or with the inner ring of the bearing. The integration of both components may allow the reduction of weight and cost of the entire unit. Further reduction of weight and costs may be achieved by also integrating the small inner ring of the bearing, the axially internal ring, with the bell of the joint. In other words, the hub may also assume the function of a single inner ring of the bearing and the bell of the joint at a constant speed.

The concept of single inner ring is already known in so-called third-generation bearings. The development of this feature foresaw the use of a single cage for both rolling bodies of the two tracks to be mounted on the axially inner side. This feature, the single cage, however, is not acceptable in current projects of bearing units that require more and more high performance. In fact, the single cage can create several problems. During the operation of the bearing, the contact angles of the two tracks with the corresponding rolling bodies (for example, spheres) may slightly differ relative to one another. Consequently, this may also change the points of contact between tracks and balls and, therefore, also the diameters of the circumference of the same sphere centers ("pitch"). On an equal angular speed of the wheel, the linear velocity varies proportionally to the "pitch change". In other words, the two rows of balls may have a different speed. The cage, which performs the function of keeping the distance between the rolling bodies, however, cannot be subjected to significant forces and as typical consequence, may disintegrates or melts if overloaded.

The case of the so-called symmetrical bearing, i.e. with the same "pitch" for both crowns of rolling bodies is now analyzed. The drawbacks outlined above, are obviously also present in the case of asymmetric bearings.

Therefore, the existing high-performance solutions, which adopt a single inner ring, require a new mounting procedure, compared to the standard applications now used.

SUMMARY OF THE INVENTION

The object of the present invention is to provide a procedure for mounting of a hub bearing unit for use with the wheels of motor vehicles, which is free from the drawbacks described above. The assembly process can be realized both in the case of bearings with symmetrical internal form, bearings with the same "pitch" for the two crowns of rolling bodies, and in the case of asymmetric bearings, bearings with different "pitch" between the two crowns of rolling bodies.

According to the present invention there is described a procedure for mounting of a hub bearing assembly, having the characteristics set out in the appended independent claim.

Additional embodiments of the invention which are preferred and/or particularly advantageous, are described according to the characteristics set forth in the appended dependent claims.

BRIEF DESCRIPTION OF DRAWINGS

The invention will now be described with reference to the accompanying drawings, which illustrate some examples of non-limiting embodiments, in which.

DETAILED DESCRIPTION OF THE INVENTION

Figure 1:
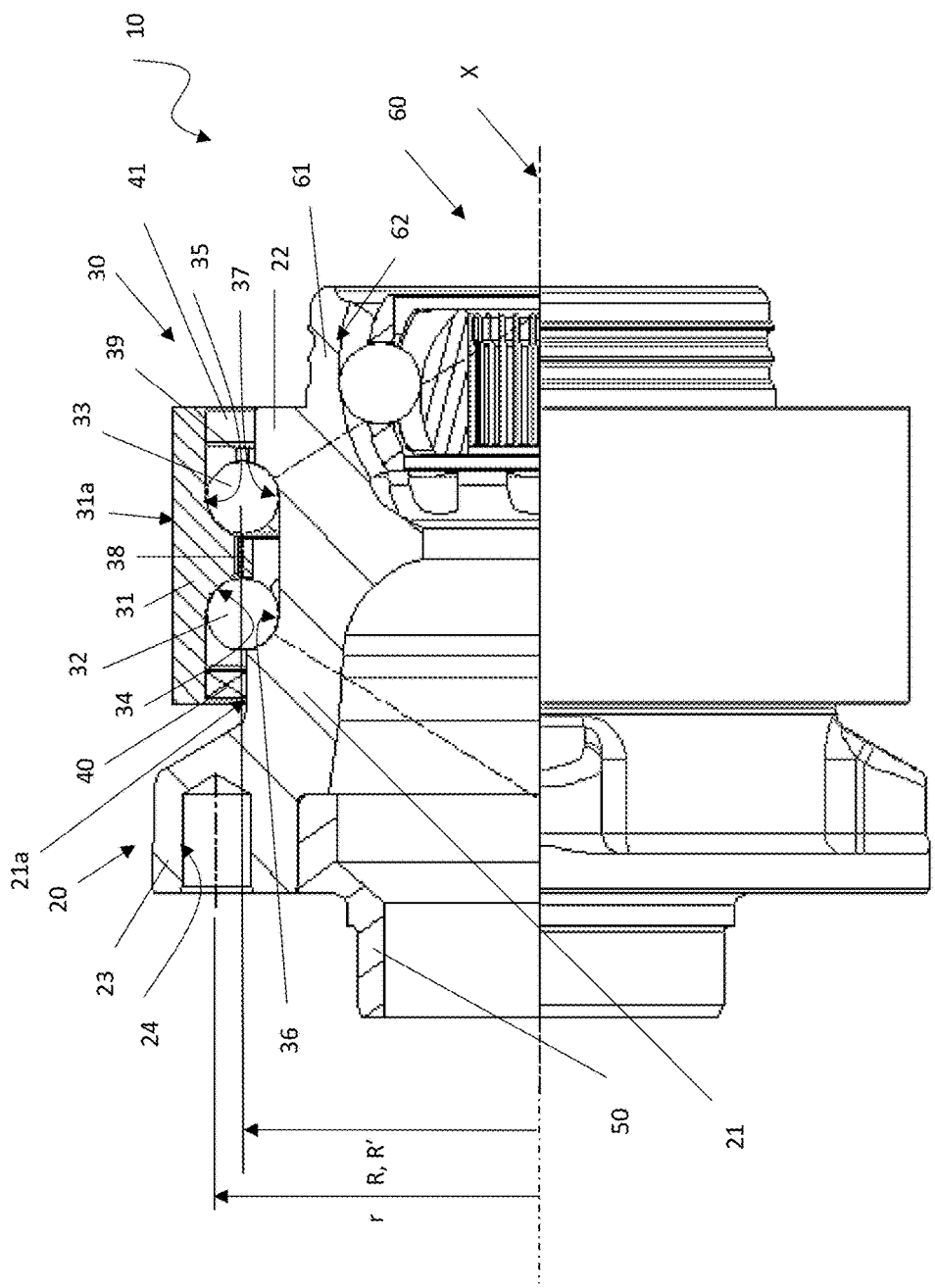
FIG. 1 is an axisymmetric sectional view of a bearing assembly with a symmetric inner shape hub, mounted according to the process of the present invention.

Referring now to FIG. 1, a hub-bearing assembly according to a preferred embodiment of the invention is indicated as a whole with 10.

The assembly 10 includes a rotatable hub 20 and a bearing unit 30. The hub 20, as will be seen better hereinafter, is configured to also take the inner rolling loop function of the bearing bell and a joint of constant speed drive. Throughout the present description and in the claims, terms and expressions indicating positions and orientations such as "radial" and "axial" refer to the axis X of the central bearing rotation unit 30. Expressions such as "axially outer" and "axially inner" refer to the mounted condition, and in this case, preferably, refer to a wheel side and, respectively, to a side opposite to the wheel side.

The bearing unit 30 provides a radially outer ring 31, stationary and two crowns of rolling bodies 32, 33, in this example balls, interposed between the radially outer ring 31 and the hub 20 with radially inner ring function. For simplicity of graphic representation references 32 and 33 will be attributed both to individual spheres, both to the crown of spheres and in particular with 32 will indicate the ring of balls or the single axially outer sphere, while with 33 will indicate the ring of balls or the single axially inner sphere. Again for simplicity, we often use the term "sphere" used by way of example in the present description and in the accompanying drawings instead of the more generic term "rolling body" (and will also be using the same numerical references). It will be understood always that in place of the spheres it may be used any other rolling I cover (for example, rollers, tapered rollers, needles, etc.).

In FIG. 1 is shown the case of a symmetrical bearing, i.e. with the same "pitch" for both crowns of rolling bodies. What will be the in the following description is also applicable to the case of the asymmetrical bearing, shown in FIG. 2, where for simplicity the same reference has been used. As can be seen, the only substantial difference between the two types of bearing is that, while in the case of symmetrical bearing the radii R, R of the circumferences of the centers of the rolling bodies of the corresponding crowns 32, 33 assume the same value, in case of asymmetrical bearing the same rays differ between them. In the example in FIG. 2, in particular, the radius R of the circle of the centers of the rolling bodies of the crown 32, axially outer, is greater than the radius R' of the circumference of the crown of the rolling bodies of the centers 33, axially inner.

The radially outer ring 31, preferably tube shaped and axially extended, defines internally the raceways 34, 35 to the corresponding rolling bodies of the crowns 32, 33.

The radially outer ring 31 has a radially outer cylindrical surface 31a adapted to mate with a cylindrical seat formed in a fixed member of the vehicle, such as a pillar of a suspension, of a known type and not shown in FIG. The cylindrical surface 31a extends for the entire axial dimension of the radially outer ring 31 and has an axial dimension of the order of magnitude of that of the cylindrical seat of the upright.

The rolling bodies of the crowns 32, 33 rotate, as well as on the ring radially outer 31, on a central tubular portion 21 of the hub 20 which defines a rolling track 36 for the rolling bodies of the axially outer crown 32 and a track of 37 for the rolling of rolling bodies of the crown 33, the axially inner. The crowns 32, rolling bodies 33 are kept in position by corresponding cages 38, 39, namely a first cage 38, axially outer, for the rolling bodies 32 and a second cage 39, axially inner, for the rolling bodies 33. A first sealing means 40 seals the bearing unit from the axially outer side, being planted on a cylindrical surface 21a, a radially outer, of the tubular portion 21 of the hub 20 and a second sealing means 41 seals the bearing unit from the axially side internal.

The hub 20 also defines a shoulder 22, on the axially inner side, and a flange portion 23 axially outer. The flange portion has a plurality of axial fixing holes 24, the axes of which are arranged along a circumference of radius r, with respect to the axis of symmetry X. These holes are the seats for the same number of fixing means (such as captive bolts, not shown in the figure) that connect in a known manner an element of the motor vehicle wheel, for example the brake disc (also of known type and not shown in the figure), to the hub 20.

Advantageously, a bushing 50 for centering the wheel of the motor vehicle can be realized by means of a metal sheet, for example of steel, and coupled to the flange portion 23 of the hub, preferably by means of a simple pressing-fit operation.

The bearing unit 30 is preferably formed such that the radii R, R' of the circumferences of the centers of the rolling bodies of the corresponding crowns 32, 33 is slightly lower than or substantially equal to the radius r of the circumference of the fixing axes of the holes 24. This substantial geometrical equality, in the case of asymmetrical bearing, will be verified at least with the radius R of the circle of the centers of the rolling bodies 32, axially external, i.e. closest to the wheel of the motor vehicle brake disc. By means of this solution, the flanged hub assumes a conformation in the manner of a rotor, i.e. its flange portion is much reduced. The above solution is obtained by increasing the radius R, R of the circumferences of the centers of the rolling bodies while the radius r of the circumference of the fixing axes of the holes 24 is left unaltered.

The transmission of the motion from a drive shaft of a motor vehicle transmission assembly (not shown) is guaranteed by a constant velocity joint 60. In particular, the outer bell of the coupling 60 is integrated in the hub 20 which in its axially inner terminal part 61 He defines the track 62 of the joint.

Figure 2:
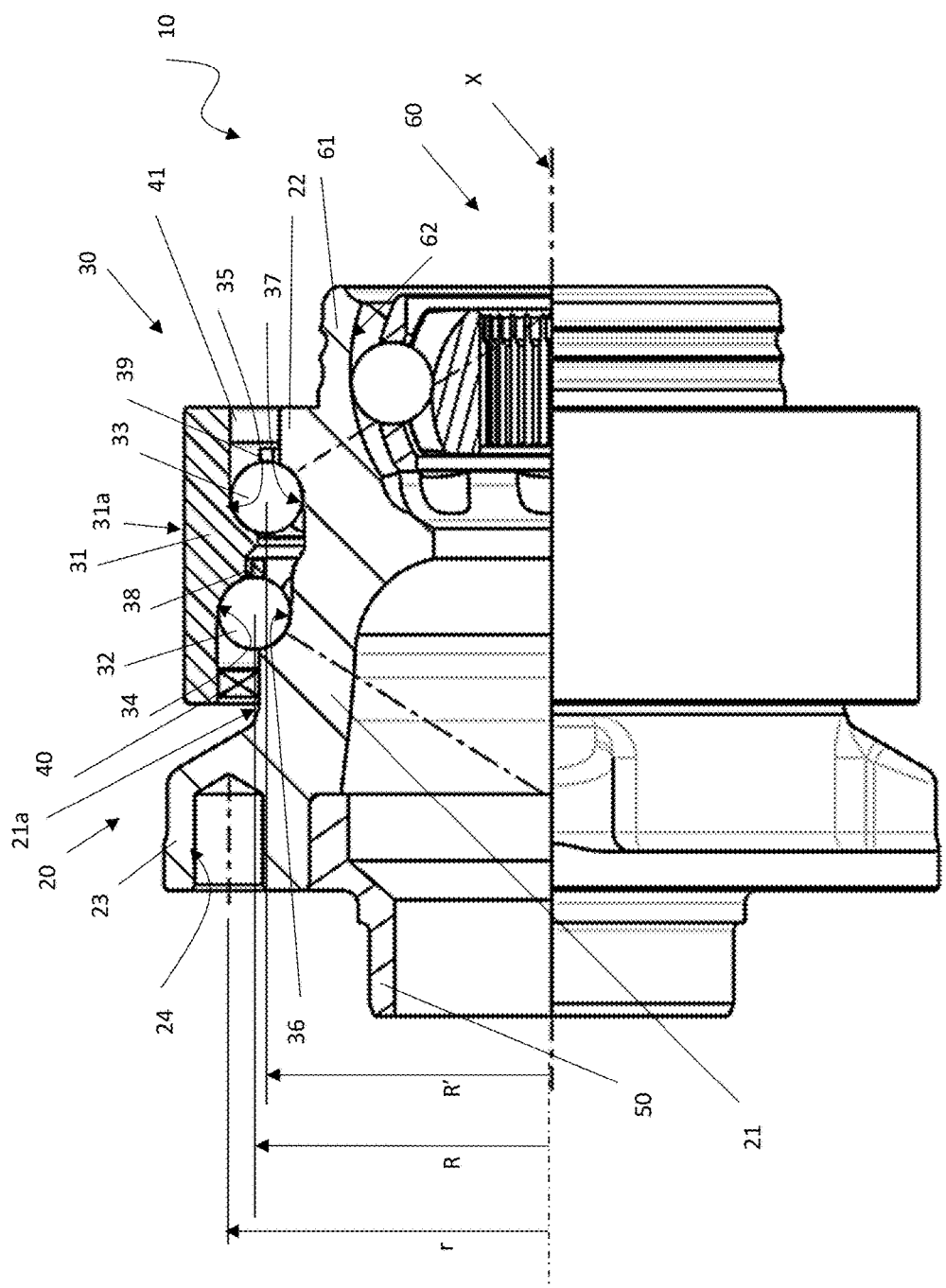
FIG. 2 is an axisymmetric sectional view of a bearing assembly with an asymmetric form internal hub, mounted according to the same procedure.

The hub, as seen in FIG. 2, is illustrated with reference to FIGS. 3 to 8, relating to the type of asymmetrical bearing. In the case of symmetrical bearing (FIG. 1), as will be evident in the following, the assembly process can be equally applied, unless a variant which will be specifically described and shown.

Figure 3:
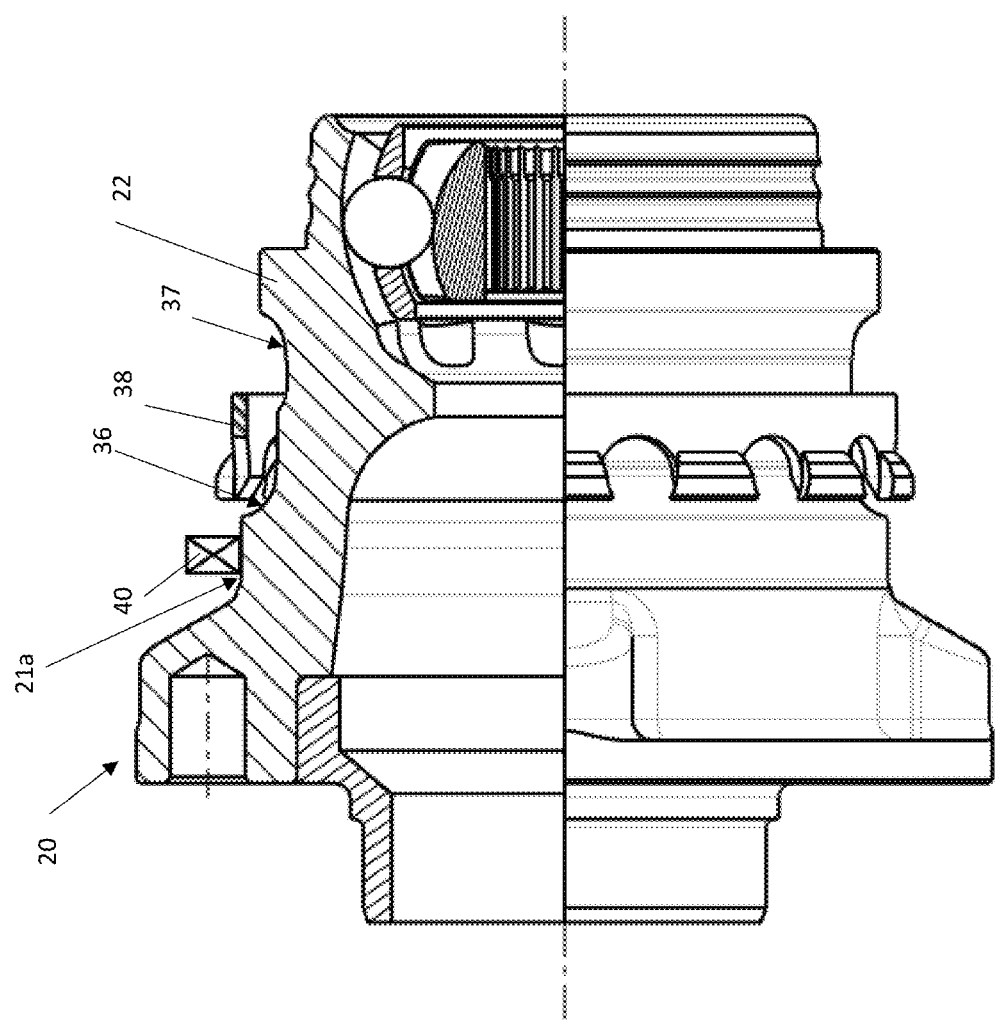
FIGS. 3 and 4 show two successive phases of the bearing assembly mounting procedure including the hub.
Figure 4:
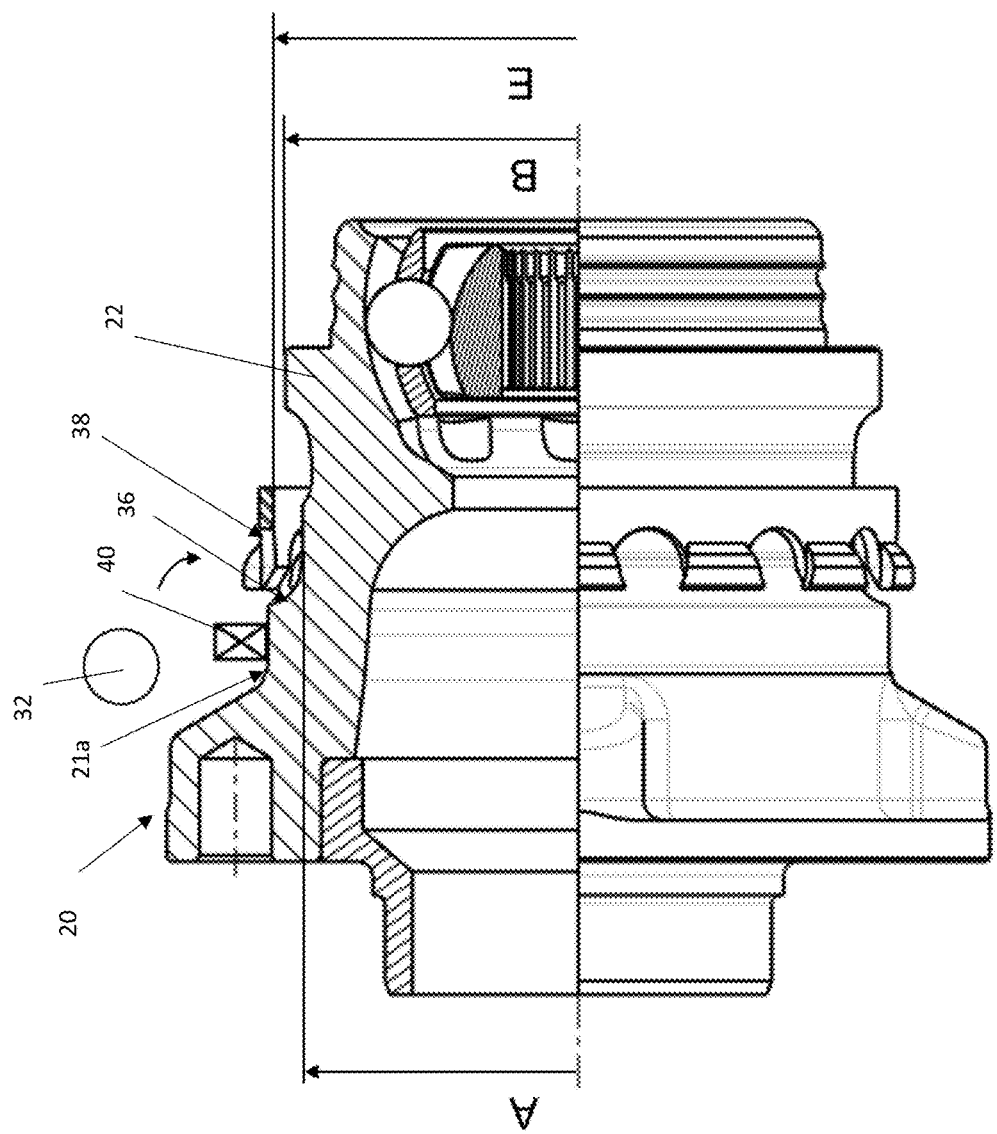

In more detail, in FIG. 3 it can be observed that, starting from the hub with the availability of inner ring function, the first sealing means 40 is planted on the rotatable hub 20, in particular on the cylindrical surface 21a of the central tubular portion 21. Subsequently, the axially outer cage 38 is mounted in correspondence with the axially outer runway 36, always from the end of the axially inner hub. With reference to FIG. 4, it should be noted that in order to be able to mount the cage 38 on the track 36 of the hub 20 (or the inner ring of the bearing), a minimum radial clearance between the diameter B of the shoulder 22 of the hub must be guaranteed 20, the axially inner side and the inner diameter E of the cage 38. In other words, B<E. The same report will have to be guaranteed also to the cage 39, an axially inner.

In case the diameter B of the axially internal shoulder 22 is greater than the minimum diameter A of the groove that defines the track 36, but is less than the inner diameter E of the cage 38, the cage can easily be mounted on the track 36 of the hub. The rolling bodies 32, axially external, may not have sufficient space to be inserted from the axially inner side and therefore must be subsequently mounted to the cage, as shown in FIG. 4. This mounting method is suitable both to a symmetrical bearing and an asymmetrical type bearing.

Figure 5:
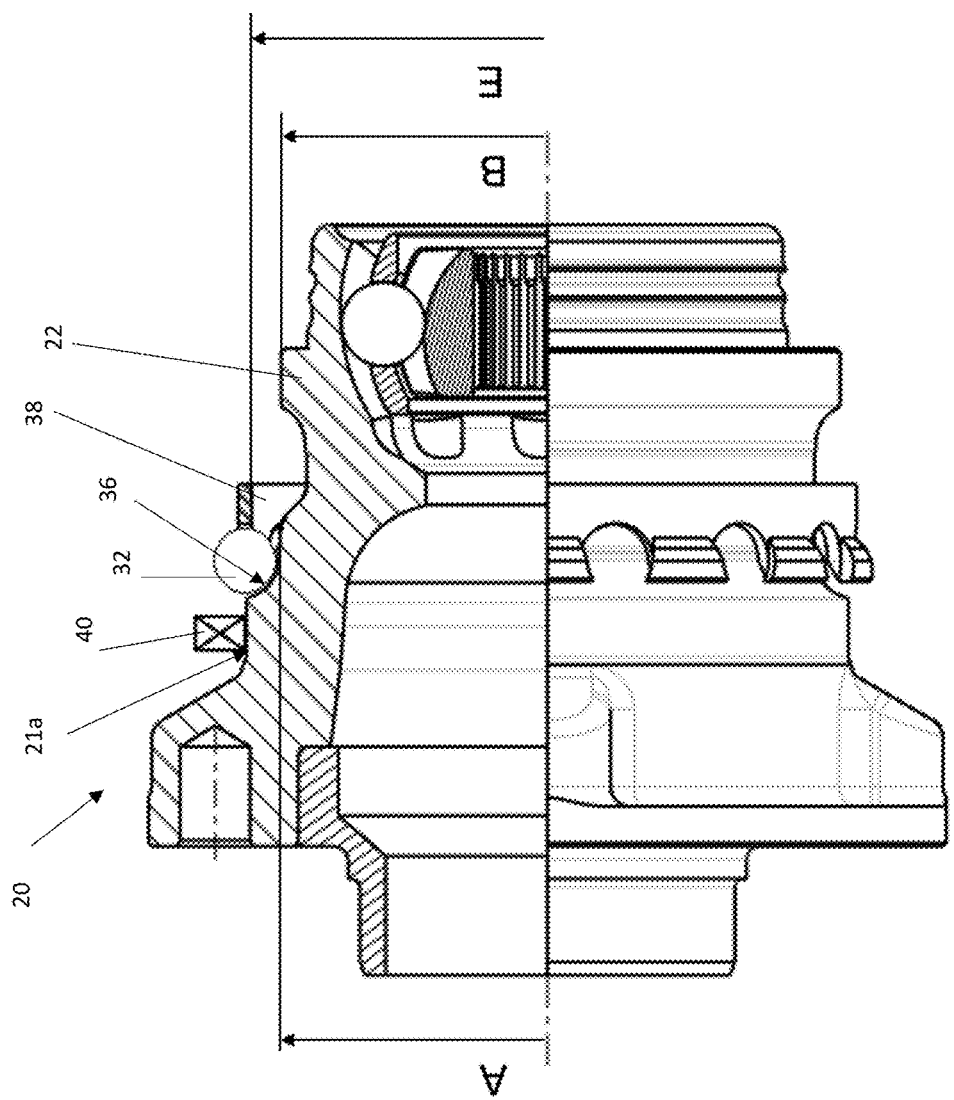
FIG. 5 shows an alternative step to those illustrated in FIGS. 3 and 4.

With reference to FIG. 5, when the diameter B of the axially inner shoulder 22 is less than or equal to the minimum diameter A of the groove that defines the track 36, there is enough space to mount on the track 36 of the hub 20 the group cage 38 and rolling bodies 32, previously pre-assembled. The abovementioned condition that allows this mounting alternative can be satisfied only in the case of asymmetric bearings, whereas it can never be so in the case of symmetrical bearings, where the diameter B will always be greater than the diameter A.

Figure 6:
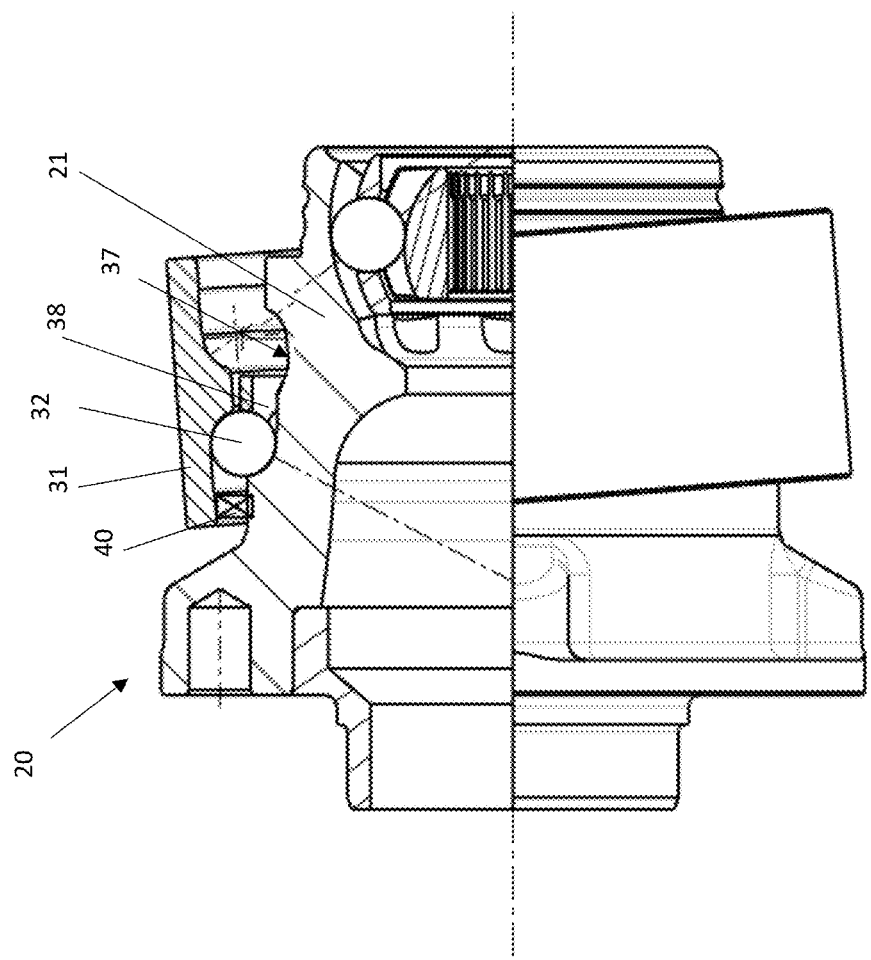
FIG. 6 shows a further stage of the same assembly procedure, subsequent to those of the preceding figures.

Below and with reference to FIG. 6, mounting the radially outer ring 31 is disclosed. The outer ring is placed in position and tilted with respect to the hub 20 (inner ring) in order to create enough space for the subsequent insertion of the rolling bodies 33, axially interior.

For easily realizing an adequate inclination of the outer ring, the axially outer sealing means 40 must be sufficiently flexible.

Figure 7:
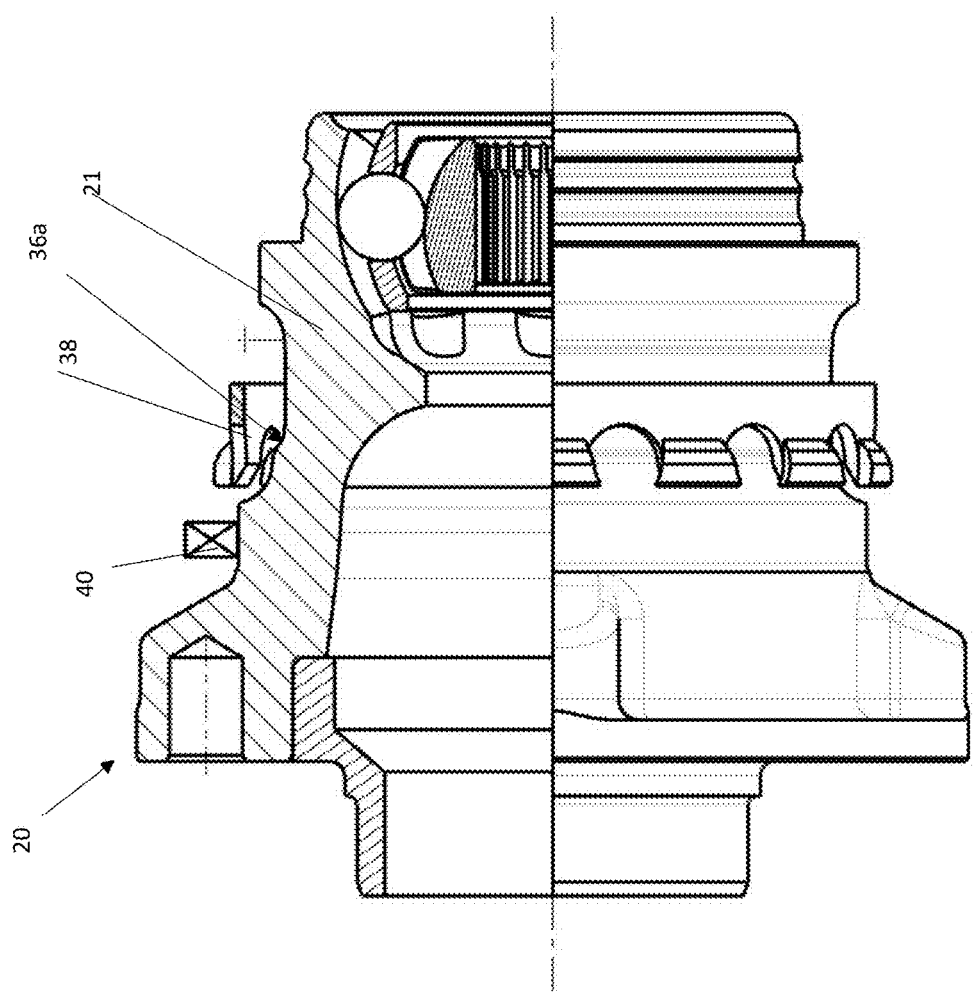
FIG. 7 shows a constructional variant useful to facilitate the assembly phase of FIG. 6.

Another way to facilitate the inclination of the radially outer ring 31 is to remove a bit of the hub 20 material from the bottom of the track 36, thus creating a small step 36a, as shown in FIG. 7.

Once all the rolling bodies 33 have been placed, it will be possible to align inner ring or outer ring and the hub so that the aforementioned rolling bodies 33 can be distributed uniformly along the entire circumference.

The number of rolling bodies that can be mounted on the track 37 with the assembly process just described is certainly lower than the maximum number achievable with standard bearing unit, provided with two radially interior rings. The new process of the present invention will allow approximately half of the number of balls to be mounted. As is known, the number of spheres heavily influences the performance of a bearing and especially its useful life. In the case of standard bearing, having a small value of the "pitch", this reduction of the number of balls would not be acceptable. Conversely, for a given application and load conditions, the bearing described here has a higher value of the "pitch" and, accordingly, can accommodate a larger number of balls. However, for the same working conditions, a greater number of balls is not necessary. Therefore, even if the number of balls that can be inserted by tilting the outer ring is less than the maximum number of balls applicable, the performance of the bearing is not penalized if the number of balls used is next to that used in the standard bearing.

Figure 8:
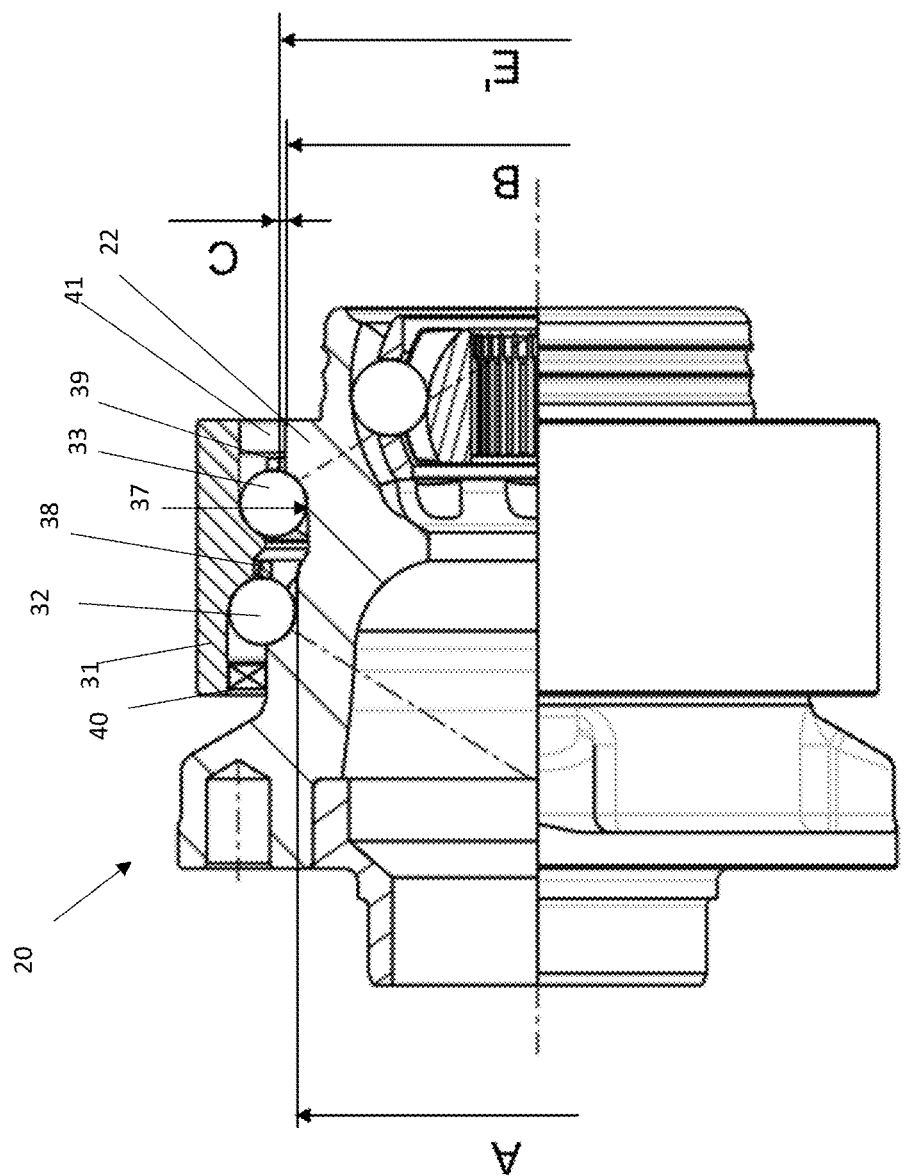
FIG. 8 shows a terminal phase of the assembly process.

With reference to FIG. 8, the cage 39, an axially inner, is then inserted to snap from the axially inner side of the rolling bodies 33, which are held in position between them equidistant from a specific tool to "comb." To avoid any contact between the cage 39 and shoulder 22, it is important that the diameter B of the shoulder 22 is less than the internal diameter E of the cage 39, reduced by twice the value of a radial distance of security C. In other words, It must be:

$B < E - 2*C$

In the case of E' the same condition will have to be applied to the cage 38, axially outer, both with respect both to the radially outer 31 and with respect to the hub 20, to ensure a minimum radial play with respect to these components.

As a last step of the process the second sealing means 41, axially inner, is planted on its premises, from the axially inner side.

Thanks to the new assembly process, as defined, these new bearing solutions may be provided whose performance is greatly improved compared to the standard solution. Since the "pitch" of the spheres is increased, the distance between the pressure centers is also increased, with very positive effects in terms of stiffness.

The useful life of the bearing is not negatively impacted since the number of balls used is comparable with that required by the standard solutions. Further, the weight of the bearings provided in those solutions is reduced greatly by this invention, having regard to the compactness of the realized solution, considered as a whole. Also, the bearing-coupling constant speed remains substantially the same weight, as the upright position of the suspension allows for the omission a remarkable amount of material.

Finally, the present invention also includes the benefits of having both a reduced the cost and a reduced number of total components.

In addition to the embodiments of the invention, as described above, it is to be understood that there are many further variants. It must be understood that these embodiments of implementation are only illustrative and do not limit the invention or its applications, nor its possible configurations. On the contrary, although the description above makes it possible to implement the present invention and at least one of its second configuration, it should be understood that numerous variations are conceivable of the components described herein, as defined in the appended claims, interpreted literally and/or according to their legal equivalents.

The invention claimed is:

1. An assembly method for a bearing-hub unit comprising:
    providing a rotatable hub that functions as a radially inner ring and a bell of a constant velocity joint, a bearing unit having a stationary radially outer ring, a first row of axially external rolling bodies, and a second row of axially external rolling bodies that are disposed between the radially outer ring and the hub, wherein the rolling bodies are housed inside corresponding cages, and sealing means, the method further comprising:
    a) press-fitting a first axially external sealing means, on a radially external cylindrical surface, of the rotatable hub,
    b) mounting the axially outer cage and rolling bodies in correspondence of an axially outer raceway of the hub,
    c) providing a step at the bottom of a groove that defines the axially outer raceway of the hub, and mounting the radially outer ring and inclination of the outer ring of a predetermined angle relative to the hub,
    d) mounting the axially internal rolling bodies, in correspondence with an axially inner raceway of the hub from the axially inner side,
    e) aligning the radially outer ring to the hub to eliminate the inclination of the outer ring,
    f) snappingly inserting the axially internal cage on rolling bodies from the axially inner side, and
    g) press-fitting a second axially internal sealing means on its own seat from the axially inner side.

2. The assembly method according to claim 1, wherein the bearing-hub unit is provided with a symmetrical internal shape or that the radius (R) of the circumference of the centers of the axially outer rolling bodies is equal to the radius (R') of the circumference of the centers of the axially inner rolling bodies.

3. The assembly method according to claim 1, wherein the bearing-hub unit is provided with an asymmetrical internal shape, or that the radius (R) of the circumference of the centers of the axially outer rolling bodies is not equal to the radius (R') of the circumference of the centers of the axially inner rolling bodies.

4. The assembly method according to claim 3, wherein during step b) the cage and the rolling bodies that are a pre-assembled sub-unit, are assembled at the same time, if the diameter (B) of the axially internal shoulder is smaller or equal to the minimum diameter (A) of a groove that defines the axially outer raceway of the hub.

5. The assembly method according to claim 1, wherein in order to perform step b) the dimension of the inner diameter (E) of the cage must be greater than the dimension of the diameter (B) of an axially inner shoulder of the hub.

6. The assembly method according to claim 1, wherein during step b) the cage is mounted first and subsequently the rolling bodies are inserted within the same cage, if the diameter (B) of the axially internal shoulder is greater than the minimum diameter (A) of a groove that defines the axially outer raceway of the hub.

7. The assembly method according to claim 1, wherein during step f) the diameter (B) of the shoulder, the inner diameter (E') of the cage and a value of a radial safety distance (C) are according to the following relationship: $B<E-2*C$.

8. The assembly method according to claim 1, wherein during step f) the rolling bodies are held in a position equidistant from one another by a specific "comb" tool.

* * * * *